United States Patent Office 3,324,128
Patented June 6, 1967

3,324,128
BIS-(PHENOXYACETYL)-PIPERAZINES
Tsutomu Irikura, Kuniyasu Masuzawa, and Keigo Nishino, Tokyo, Japan, assignors to Kyorin Seiyaku Kabushiki Kaisha, Tokyo, Japan
No Drawing. Filed Sept. 22, 1964, Ser. No. 398,380
Claims priority, application Japan, Sept. 26, 1963, 38/51,383
5 Claims. (Cl. 260—268)

This invention relates to piperazine derivatives having the general formula

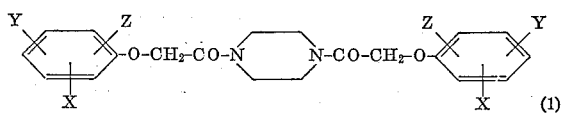

in which X is selected from the group consisting of halogen and trifluoromethyl ($CF_3$), Y is selected from the group consisting of hydrogen and alkoxyl and Z is selected from the group consisting of hydrogen and alkyl, and to processes for producing the same.

1,4-bis halogen-substituted phenoxyacetyl piperazine derivatives as set forth in the general Formula 1 which have not heretofore been described in the literature evidence a useful pharmacological action in that they exhibit depressive activity against the central nervous system and potent analgesic activity with little toxic character.

These compounds are prepared by the reaction of 1,4-bis haloacetyl piperazine with simple halophenols or halophenols containing alkoxyl and/or alkyl group or groups, under the presence of alkali hydroxide, alkali salt and alcoholate, in water or alcohol.

The reaction can be expressed in the reaction formula as follows:

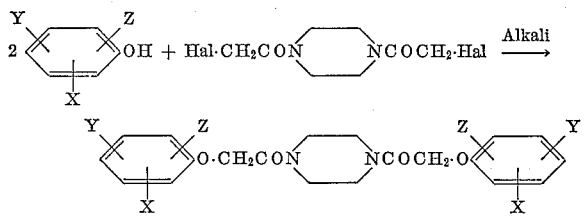

The analgesic effect, as measured by the tail pressure method on mice of some of the derivatives obtained by the process is tabulated.

EXAMPLE 1
*1,4-bis(2-chlorophenoxyacetyl) piperazine*

To 200 ml. of ethanol, 2.3 g. (0.1 mole) of metallic sodium and then 12.96 g. (0.1 mole) of o-chlorophenol were added. The solution was then mixed with 11.95 g. (0.05 mole) of 1,4-bis chloroacetyl piperazine, and heated under stirring until the solution became neutral. A white crystalline substance thus formed was collected on Buckner funnel, placed in and washed with a large amount of water, and then recrystallized from hot dimethylformamide. The final command, the melt point of which was 252.5–253° C., was obtained with the yield of 13.5 g. (63.9%). Analysis of N: calculated, 6.62%; found, 6.88%.

EXAMPLE 2
*1,4-bis(4-chlorophenoxyacetyl) piperazine*

To 200 ml. of ethanol, 2.3 g. of metallic sodium and then 12.96 g. of p-chlorophenol were added. The solution was mixed with 11.95 g. of 1,4-bis chloroacetyl piperazine, and heated under stirring until the solution became neutral. A white crystalline substance thus formed was separated by filtering, placed in and washed with a large amount of water, and then recrystallized from hot dimethylformamide. The final compound, the melting point of which was 235–235.5° C., was obtained with the yield of 14 g. (66.2%). Analysis of N: calculated, 6.62%; found, 6.52%.

EXAMPLE 3
*1,4-bis(2-bromophenoxyacetyl) piperazine*

To 200 ml. of ethanol, 2.3 g. of metallic sodium and then 17.3 g. of o-bromophenol were added. The solution was mixed with 11.95 g. of 1,4-bis chloroacetyl piperazine, and heated under stirring until the solution became neutral. A white crystalline substance thus formed was separated by filtering, placed in and washed with a large amount of water, and then recrystallized from hot dimethylformamide. The final compound, the melting point of which was 25.6° C., was obtained with the yield of 16.4 g. (64.1%). Analysis of N: calculated, 5.47%; found, 5.71%.

EXAMPLE 4
*1,4-bis(3-chlorophenoxyacetyl) piperazine*

To 100 ml. of absolute ethanol in which 2.3 g. of metallic sodium was dissolved, 13 g. of 3-chlorophenol was added. The solution was then mixed with 12 g. of 1,4-bis chloroacetyl piperazine under stirring, and con-

|  | Compound | $ED_{50}$ (mg./kg.) | Confidence limit at $P=0.05$ | Efficacy ratio relative to codeine |
|---|---|---|---|---|
| Control | Codeine phosphate | 43.0 | 39.4–46.9 | 1 |
| Compound of this invention expressed in the formula [1]. | X=o-chloro, Y, Z=H | 37.2 | 30.0–46.1 | 1.16 |
|  | X=m-chloro, Y, Z=H | 36.5 | 30.9–43.1 | 1.18 |
|  | X=p-chloro, Y, Z=H | 47.7 | 33.6–67.7 | 0.90 |
|  | X=o-bromo, Y, Z=H | >200 |  | <0.2 |
|  | X=6-bromo, Y=2-methoxy, Z=4-n-propyl | >200 |  | <0.2 |

The present invention is further illustrated by the following examples.

tinuously stirred while heated until the solution became neutral. A crystalline substance obtained after cooling was separated by filtering, washed with water, then recrystallized from dimethylformamide to obtain white needles. Yield: 15.6 g. (73.6% of the theoretical); melting point, 193–4° C.; analysis of N: calculated, 6.62%, found, 6.66%.

EXAMPLE 5

*1,4-bis[(2-methoxy-4-n-propyl-6-bromo) phenoxyacetyl] piperazine*

In 50 ml. of ethanol in which 1.08 g. of metallic sodium was dissolved, 11.5 g. of 2-methoxy-4-n-propyl-6-bromophenol, 11.2 g. of 1,4-bis chloroacetyl piperazine and 50 ml. of ethanol were added in the given order. The mixture was subjected to heating under reflux for 5 hours with stirring and then filtered while hot to remove insoluble matters. The filtrate was evaporated to give a viscous matter. Recrystallization from dimethylformamide gave the final compound, the melting point of which was 175–177° C., with the yield of 22 g., (72.5%). Analysis of N: calculated, 4.27%; found, 4.50%.

EXAMPLE 6

*1,4-bis(2-bromophenoxy acetyl) piperazine*

To 20 ml. of absolute ethanol in which 0.42 g. of metallic sodium was dissolved, was added 3.15 g. of 2-bromophenol. Three grams of 1,4-bis bromoacetyl piperazine was aded in fractions to the solution and the mixture was heated under stirring until the solution became neutral. The crystalline substance obtained from the cooled mixture was collected on Buchner funnel thoroughly washed with water to remove inorganic impurities, and recrystallized from dimethylformamide to give 3.66 g. (78% of the theoretical quantity) of the final compound in white needles, the melting point of which was 254–256° C. Analysis of N: calculated, 5.47%; found, 5.66%.

What we claim is:
1. A compound derivative of the formula

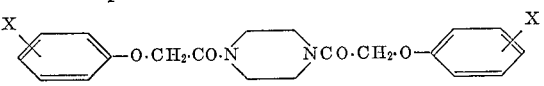

in which both X are the same and are selected from the group consisting of halogen and trifluoromethyl ($CF_3$).
2. 1,4-bis(2-chlorophenoxy-acetyl) piperazine.
3. 1,4-bis(4-chlorophenoxy-acetyl) piperazine.
4. 1,4-bis(2-bromophenoxy-acetyl) piperazine.
5. 1,4-bis(3-chlorophenoxy-acetyl) piperazine.

References Cited

UNITED STATES PATENTS

| | | | |
|---|---|---|---|
| 2,286,390 | 6/1942 | Sparks | 260—268 |
| 3,010,996 | 11/1961 | Litvan et al. | 260—559 |
| 3,133,119 | 5/1964 | Nikawitz | 260—559 |
| 3,184,463 | 5/1965 | Irikura et al. | 260—268 |

OTHER REFERENCES

Chemical Abstracts, vol. 60, p. 1008, January 1964 (abstract of Irikura et al., Yakugaku Zasshi, vol. 83, pp. 785–91, 1963).

Chemical Abstracts, vol. 61, pp. 11997–11998, November 1964 (abstract of Irikura et al., Yakugaku Zasshi, vol. 84, pp. 744–51, 1964).

ALEX MAZEL, *Primary Examiner.*

HENRY R. JILES, *Examiner.*

JAMES W. ADAMS, *Assistant Examiner.*